(12) United States Patent
Ishiyama et al.

(10) Patent No.: US 7,981,168 B2
(45) Date of Patent: Jul. 19, 2011

(54) COMPACT HEAT EXCHANGER MADE OF CERAMICS HAVING CORROSION RESISTANCE AT HIGH TEMPERATURE

(75) Inventors: Shintaro Ishiyama, Ibaraki-ken (JP); Shigeki Maruyama, Kanagawa-ken (JP)

(73) Assignees: Japan Atomic Energy Research Institute, Chiba-Ken (JP); Kabushiki Kaisha Toshiba, Tokyo (JP)

( * ) Notice: Subject to any disclaimer, the term of this patent is extended or adjusted under 35 U.S.C. 154(b) by 115 days.

(21) Appl. No.: 12/232,532

(22) Filed: Sep. 18, 2008

(65) Prior Publication Data

US 2009/0025919 A1 Jan. 29, 2009

Related U.S. Application Data

(60) Division of application No. 11/514,139, filed on Sep. 1, 2006, now abandoned, which is a continuation of application No. 10/922,153, filed on Aug. 20, 2004, now Pat. No. 7,168,481.

(30) Foreign Application Priority Data

Aug. 20, 2003 (JP) ................................ 2003-295841

(51) Int. Cl.
C09C 1/00 (2006.01)
C01B 3/04 (2006.01)
C01B 13/02 (2006.01)
C01B 7/14 (2006.01)
C01B 17/50 (2006.01)
C01B 17/69 (2006.01)

(52) U.S. Cl. ...... 23/293 R; 423/500; 423/522; 423/539; 423/579; 423/658.2

(58) Field of Classification Search ............... 423/579, 423/658.2, 500, 539, 522; 23/293 R
See application file for complete search history.

(56) References Cited

U.S. PATENT DOCUMENTS

| | | | |
|---|---|---|---|
| 1,571,068 A | 1/1926 | Stancliffe | |
| 1,657,704 A | 1/1928 | Wescott | |
| 1,794,573 A | 3/1931 | Arnoult | |
| 2,821,369 A | 1/1958 | Hilliard | |
| 2,887,303 A | 5/1959 | Reys | |
| 2,887,304 A | 5/1959 | Hilliard | |
| 3,106,957 A | 10/1963 | Cannon | |
| 3,272,260 A | 9/1966 | Raub et al. | |
| 3,315,739 A | 4/1967 | Kearney | |
| 3,318,375 A | 5/1967 | Johann et al. | |
| 3,940,301 A | 2/1976 | Straw et al. | |
| 4,083,400 A | 4/1978 | Dziedzic et al. | |
| 4,089,939 A * | 5/1978 | Norman et al. | 423/658.2 |
| 4,089,940 A * | 5/1978 | Norman et al. | 423/658.2 |
| 4,127,644 A * | 11/1978 | Norman et al. | 423/658.2 |
| 4,156,625 A | 5/1979 | Wachendorfer, Sr. | |

(Continued)

OTHER PUBLICATIONS

U.S. Appl. No. 10/922,153, filed Aug. 20, 2004, Shintaro Ishiyama et al., Japan Atomic Energy Research Institute.

(Continued)

Primary Examiner — Wayne Langel

(57) ABSTRACT

Ceramic materials that are highly resistant to strong acids such as concentrated sulfuric acid and halides such as hydrogen iodide are employed to make block elements through which a large number of circular ingress channels extend in perpendicular directions and which are joined and piled in the heat exchanging medium section to provide a compact heat exchanger that excels not only in corrosion resistance but also in high-temperature strength.

1 Claim, 19 Drawing Sheets

U.S. PATENT DOCUMENTS

| | | | |
|---|---|---|---|
| 4,271,110 A | | 6/1981 | Minjolle |
| 4,279,297 A | | 7/1981 | Dziedzic et al. |
| 4,330,523 A | * | 5/1982 | Brecher et al. ............... 423/579 |
| 4,410,505 A | * | 10/1983 | O'Keefe et al. ............ 423/658.2 |
| 4,421,734 A | * | 12/1983 | Norman ..................... 423/658.2 |
| 4,488,920 A | | 12/1984 | Danis |
| 4,526,635 A | | 7/1985 | Heinrich et al. |
| 4,711,298 A | | 12/1987 | Rogier et al. |
| 4,934,453 A | | 6/1990 | Ganz et al. |
| 5,063,995 A | | 11/1991 | Forster et al. |
| 5,322,116 A | | 6/1994 | Galloway et al. |
| 7,168,481 B2 | * | 1/2007 | Ishiyama et al. .............. 165/165 |

OTHER PUBLICATIONS

U.S. Appl. No. 11/514,139, filed Sep. 1, 2006, Shintaro Ishiyama et al., Japan Atomic Energy Research Institute.

* cited by examiner

Fig. 3
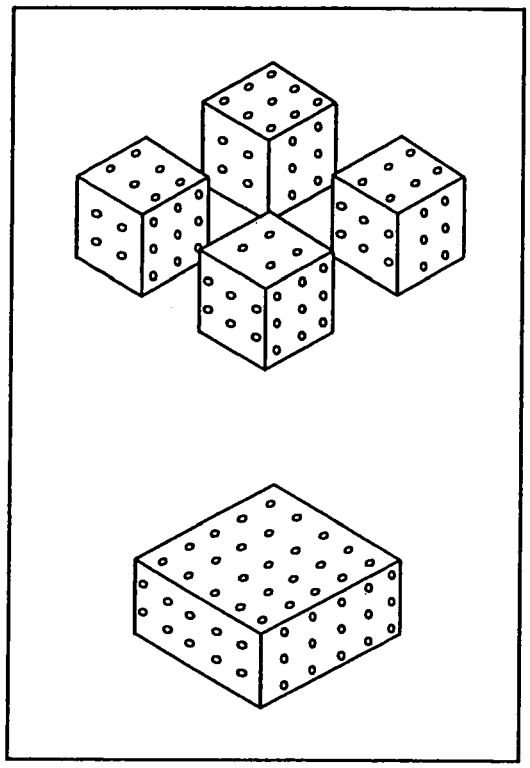
CERAMIC BLOCK ELEMENTS
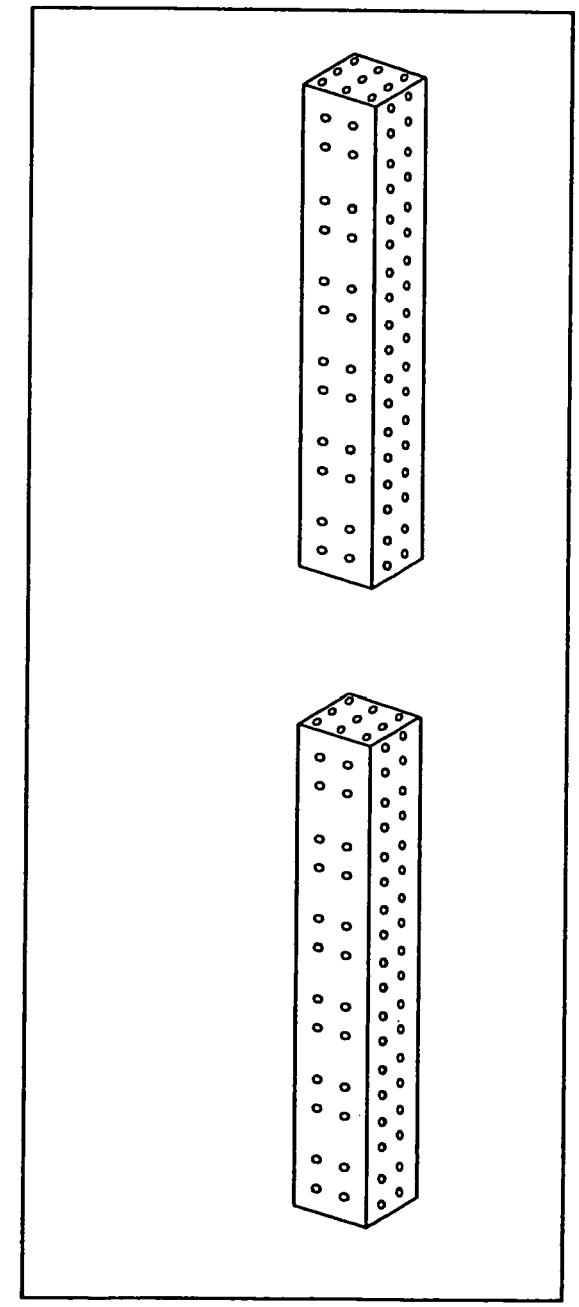
CERAMIC PILLARS

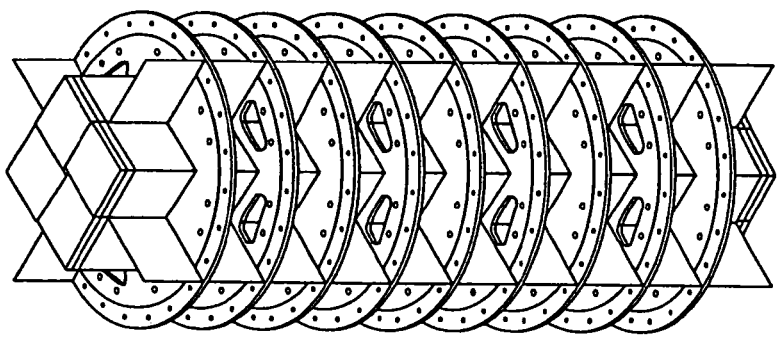
Fig. 7
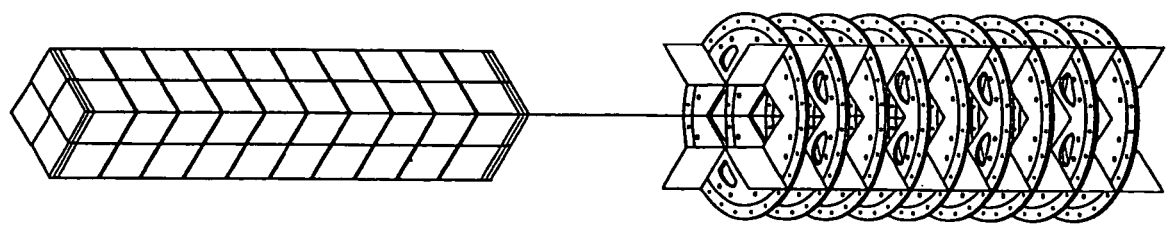

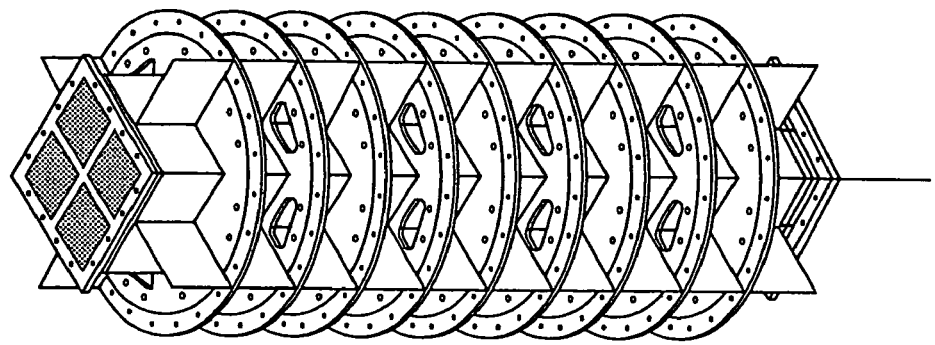
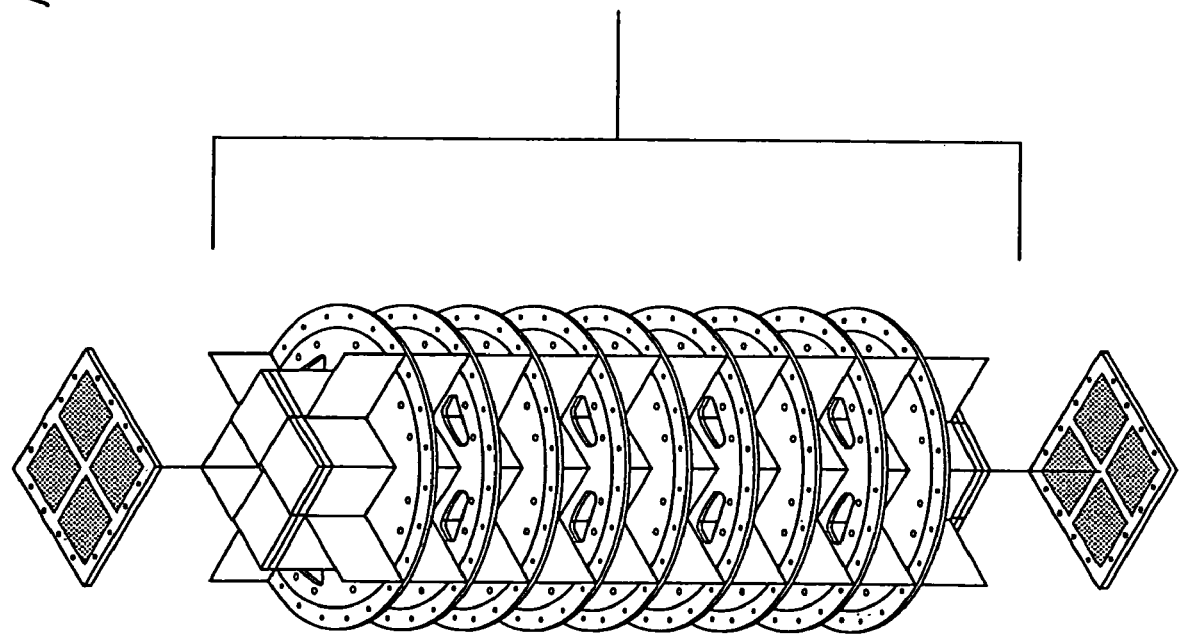
Fig. 8

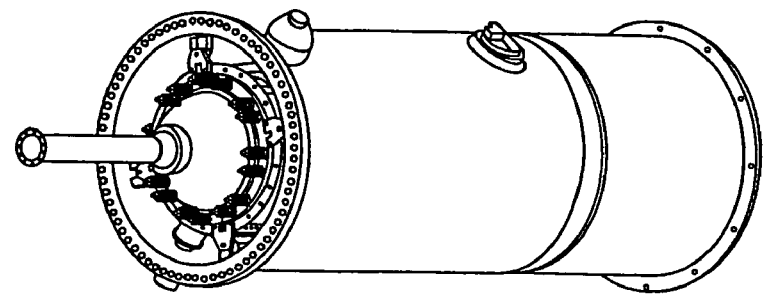
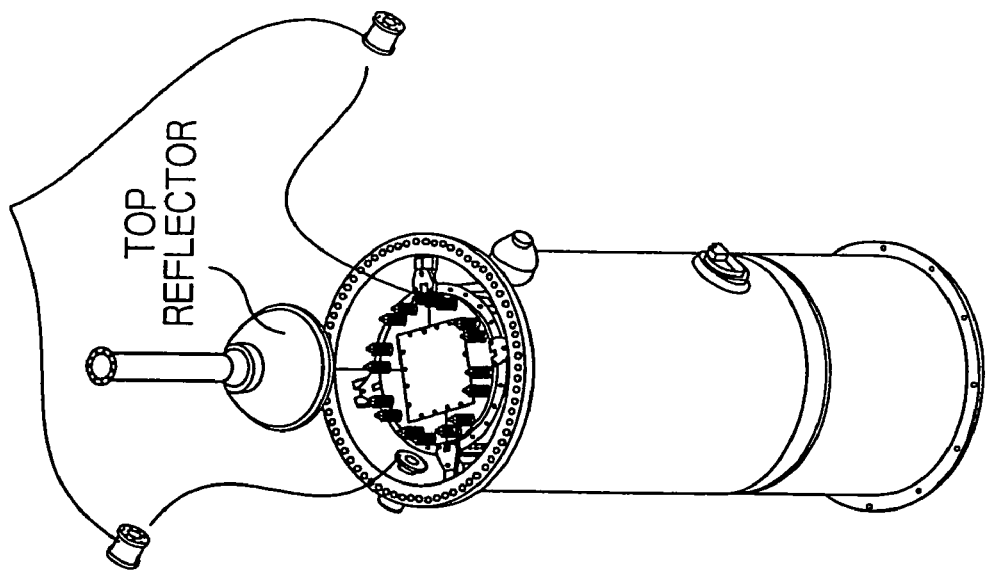
Fig. 15

Fig. 16
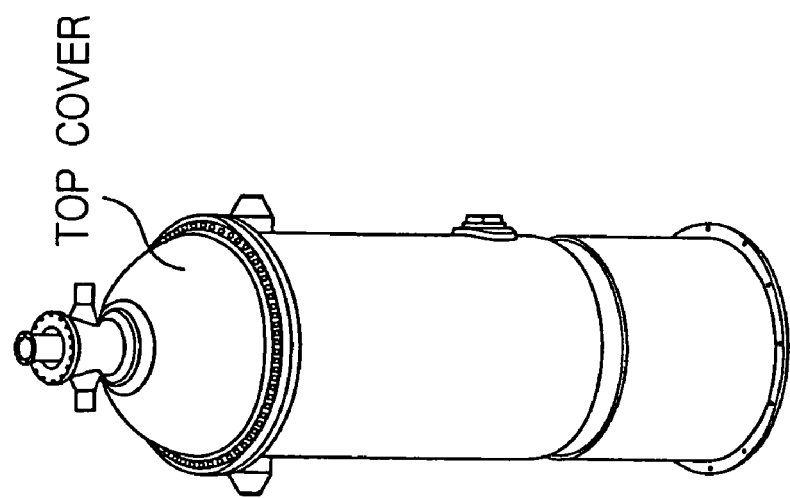
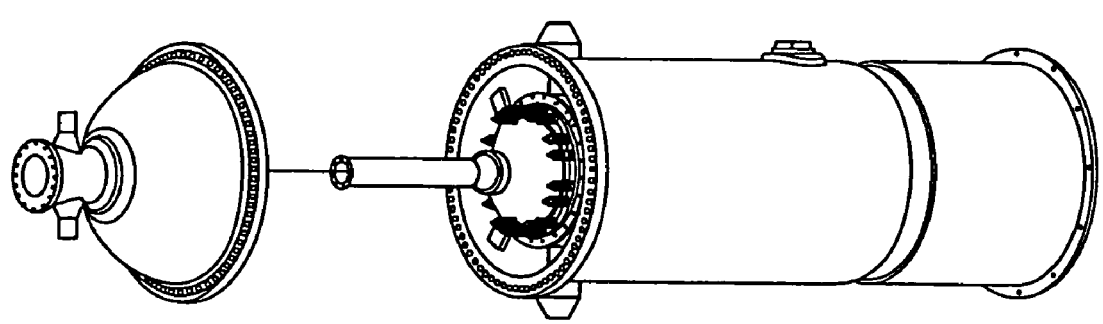

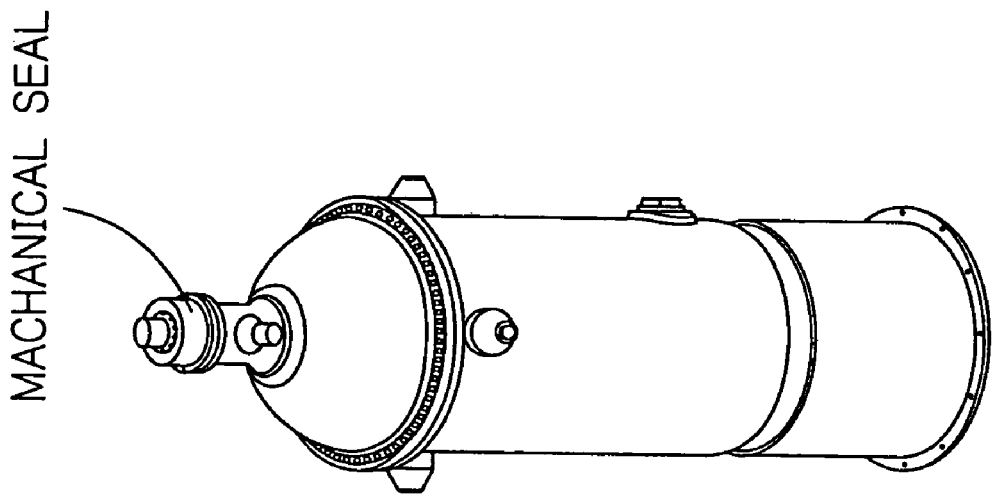
Fig. 17
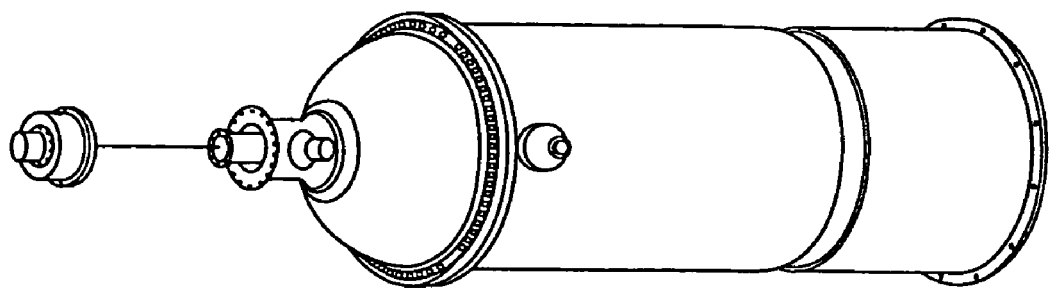

Fig. 19
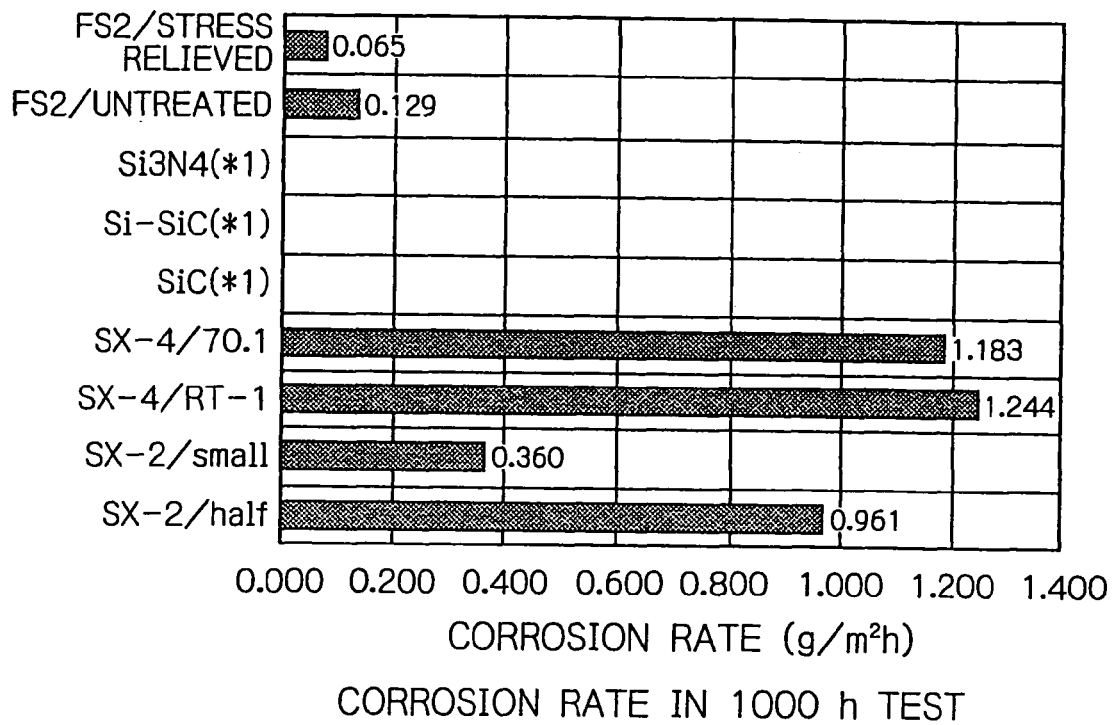
CORROSION RATE IN 1000 h TEST
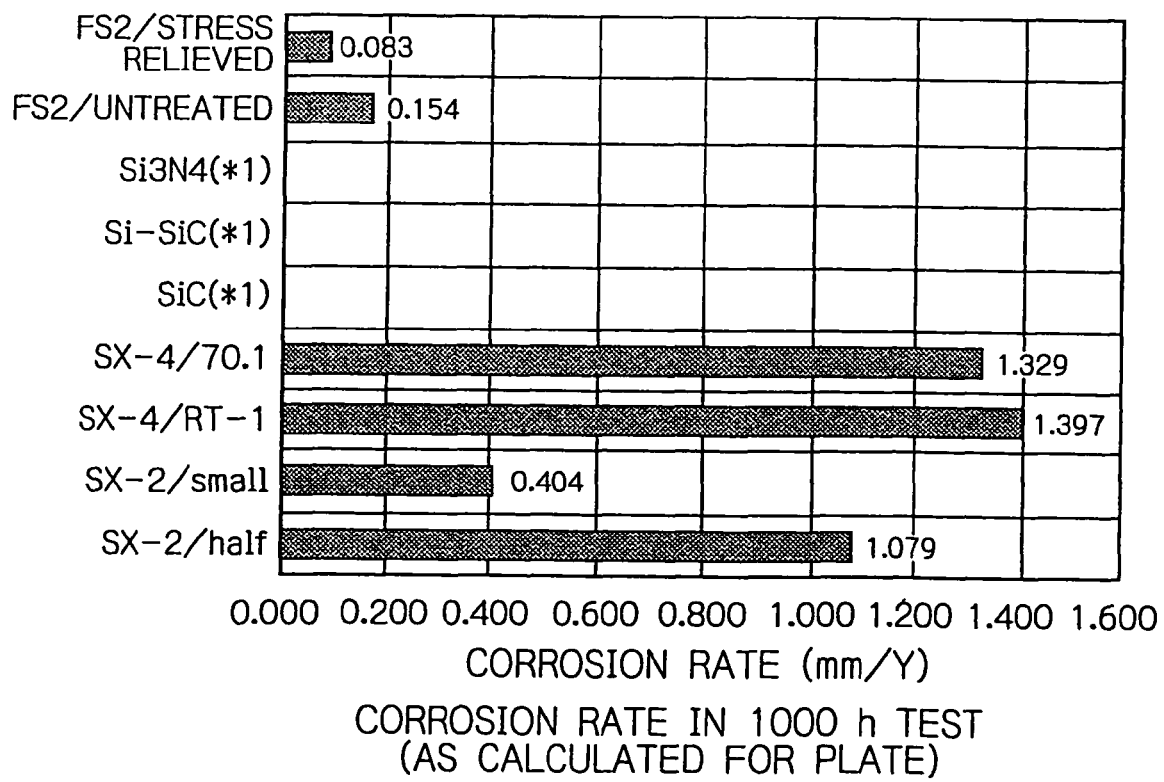
CORROSION RATE IN 1000 h TEST
(AS CALCULATED FOR PLATE)

COMPACT HEAT EXCHANGER MADE OF CERAMICS HAVING CORROSION RESISTANCE AT HIGH TEMPERATURE

This application is a divisional of prior U.S. patent application Ser. No. 11/514,139, filed Sep. 1, 2006 now abandoned, which is a continuation of prior U.S. patent application Ser. No. 10/922,153, filed Aug. 20, 2004 now U.S. Pat. No. 7,168,481, which claimed priority to Japanese Patent Application No. 2003-295841, filed Aug. 20, 2003, the entire contents of which are incorporated herein by reference.

BACKGROUND OF THE INVENTION

This invention relates to heat exchangers that have the heat exchanging section composed of ceramic blocks and which are applicable to wide areas including the atomic industry, aerospace, industries in general, and consumers use.

No corrosion-resistant materials have heretofore been available that enable concentrated sulfuric acid solutions to be vaporized and hydrogen iodide solutions to be vaporized and decomposed under high-temperature (>1000° C.) and high-pressure (>6 MPa) conditions; heat exchangers for such purposes have also been unavailable. To date, several ceramics manufacturers have made attempts to fabricate heat exchangers for high-temperature operation by using ceramic blocks but all failed to make large enough equipment on account of inadequacy in the strength of the blocks.

SUMMARY OF THE INVENTION

An object, therefore, of the present invention is to provide a heat exchanger that withstands heat exchange in large capacities ranging from several tens to a hundred megawatts in high-temperature (>1000° C.) and high-pressure (>6 MPa) environments of strong acids and halides in a solution as well as a gaseous phase and which yet can be fabricated in a compact configuration.

According to the present invention, ceramic materials that are highly resistant to strong acids such as concentrated sulfuric acid and halides such as hydrogen iodide are employed to make block elements through which a large number of circular ingress channels extend in perpendicular directions; by joining such block elements and piling them in the heat exchanging medium section, the invention provides a compact heat-exchanger that excels not only in corrosion resistance but also in high-temperature strength.

The compact heat exchanger of the invention which withstands high temperature (~1000° C.) and high pressure as well as exhibiting high corrosion resistance can also be used as an intermediate heat exchanger in hot gas furnaces.

BRIEF DESCRIPTION OF THE DRAWINGS

FIG. 3 shows the shapes of ceramic blocks and experimentally fabricated ceramic pillars;

FIG. 7 shows how section plates and partition plates are assembled;

FIG. 8 shows ceramic flow rate regulating plates as attached to the top and bottom of the fabricated heat exchanging section;

FIG. 15 shows how a top reflector and helium inlet bellows are attached;

FIG. 16 shows a top cover as it is fitted on the pressure vessel;

FIG. 17 shows a mechanical seal as it is fitted on the pressure vessel;

FIG. 19 shows the results of the high-temperature, high-pressure corrosion test conducted on various ceramics and refractory alloys.

DETAILED DESCRIPTION OF THE INVENTION

Figure 1:
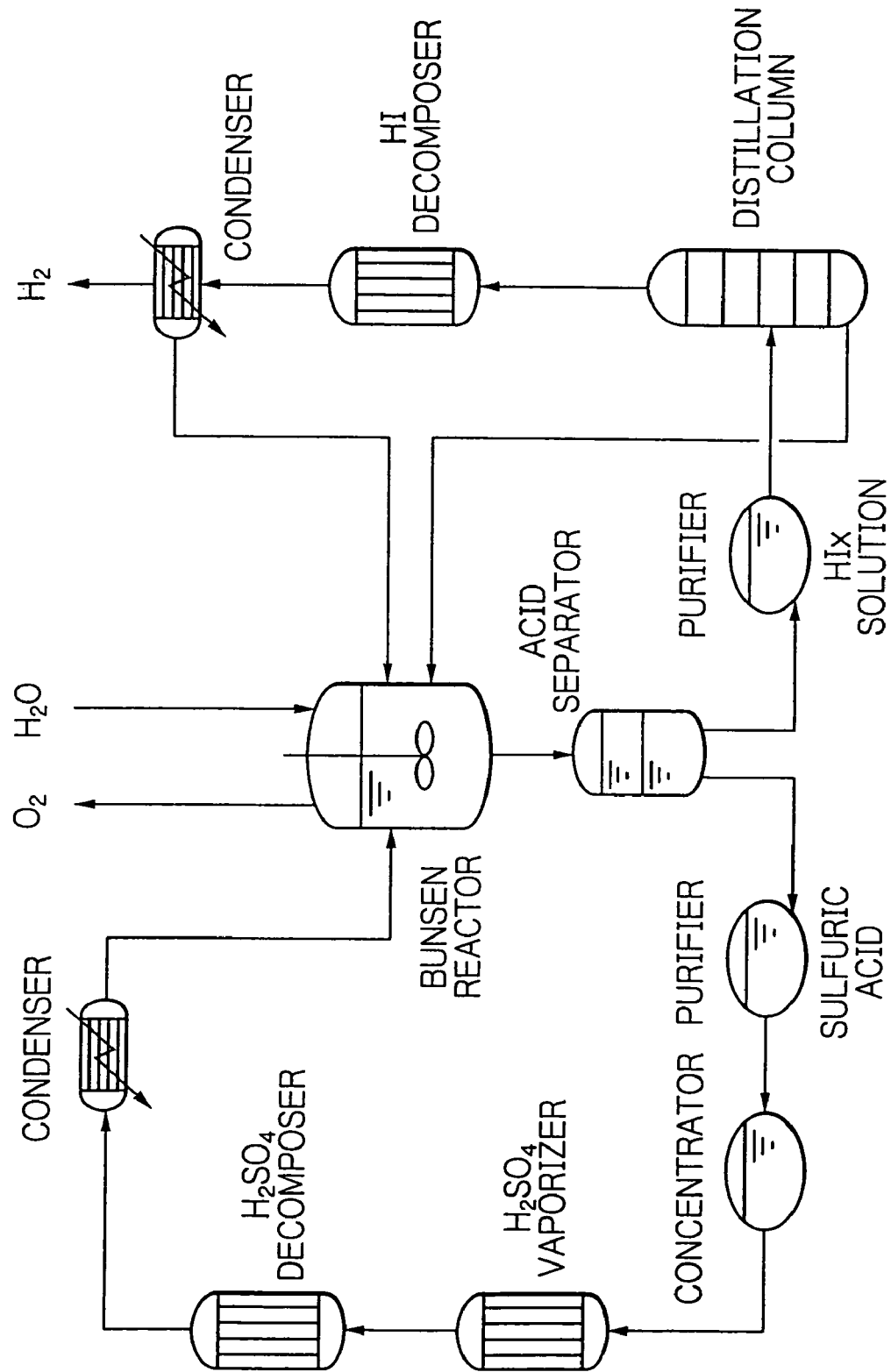
FIG. 1 shows the concept of a nuclear thermochemical IS plant.

The invention provides a heat exchanger essential for realizing commercialization of a nuclear thermochemical IS plant that can produce large quantities of hydrogen and oxygen from the water feed using nuclear heat with 950° C. FIG. 1 shows the concept of a nuclear thermochemical IS plant. Among the various components shown, those which are operated under the most rigorous conditions are the sulfuric acid vaporizer and the hydrogen iodide decomposer.

FIG. 1 shows the concept of a nuclear thermochemical IS plant; the reaction involved is such that using the hot thermal energy of 850° C. as supplied from the hot gas furnace, water as the feed is decomposed into hydrogen and oxygen primarily through the combination of a sulfuric acid decomposing and regenerating cycle with a hydrogen iodide decomposing and synthesizing cycle.

To be more specific, $H_2O$ as supplied into the Bunsen reactor is decomposed under high-temperature, high-pressure conditions in the presence of both $H_2SO_4$ and HI. After the reaction, the liquid portion containing $H_2SO_4$ and HI is supplied into the acid separator where it is separated into two layers of $H_2SO_4$ and HI. The HI containing solution passes through the purifier to be supplied into the distillation column; the resulting HI vapor is decomposed in the HI decomposer and the product $H_2$ is recovered from the condenser. The distillation residue in the distillation column and the condensate in the condenser are returned to the reactor.

The $H_2SO_4$ containing solution coming from the acid separator passes through the purifier to be supplied into the concentrator and the concentrated $H_2SO_4$ solution is subjected to vaporization in the $H_2SO_4$ vaporizer; the resulting vapor is fed into the $H_2SO_4$ decomposer, where it is decomposed into $SO_2$, $H_2O$ and $O_2$, which then pass through the condenser to return to the Bunsen reactor.

Figure 2:
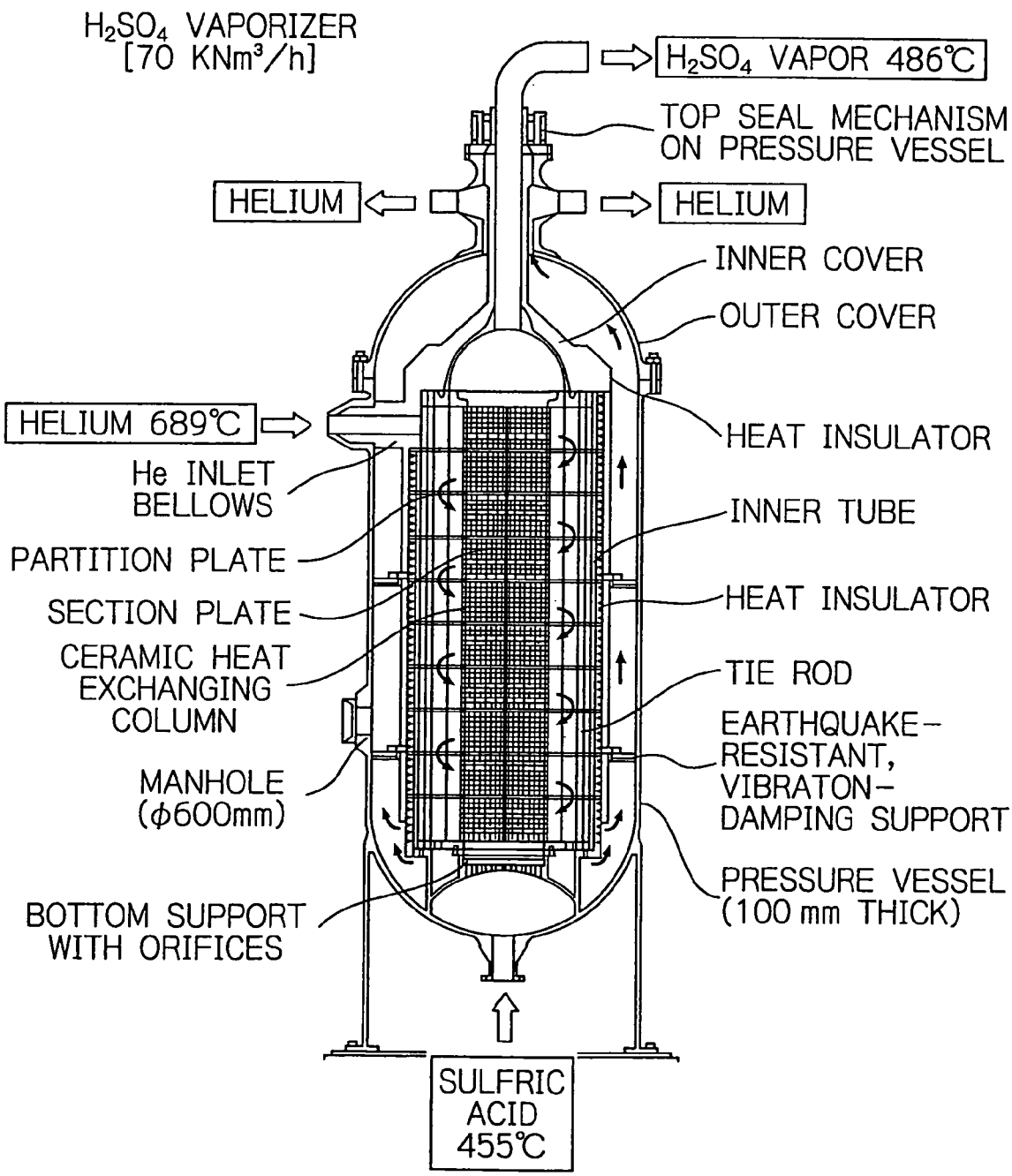
FIG. 2 shows the design concept of a concentrated sulfuric acid vaporizer in actual operation.

FIG. 2 shows the design concept of a concentrated sulfuric acid vaporizer in actual operation. A concentrated sulfuric acid solution is supplied from the furnace bottom of the vaporizer toward the upper arm, whereas helium gas with 689° C. is introduced laterally through the upper arm of the vaporizer; the two feeds are respectively guided to the perpendicular channels through each of the ceramic blocks in the vaporizer, where they undergo heat exchange until the concentrated sulfuric acid is completely gasified.

FIG. 3 shows the shapes of ceramic blocks and experimentally fabricated ceramic pillars. Individual blocks are piled up along the four sides of the cross-shaped perforated section plate provided through the center of the sulfuric acid vaporizer shown in FIG. 2 and they are held in position as the sulfuric acid feed is flowed upward through six or nine channels (holes) opened in two sides of each block. The hot helium gas feed is flowed laterally through four channels (holes) opened in a side of each block, whereby the sulfuric acid is heated via each block. The two groups of channels are formed in the block in such a way that they do not communicate with each other.

Figure 4:
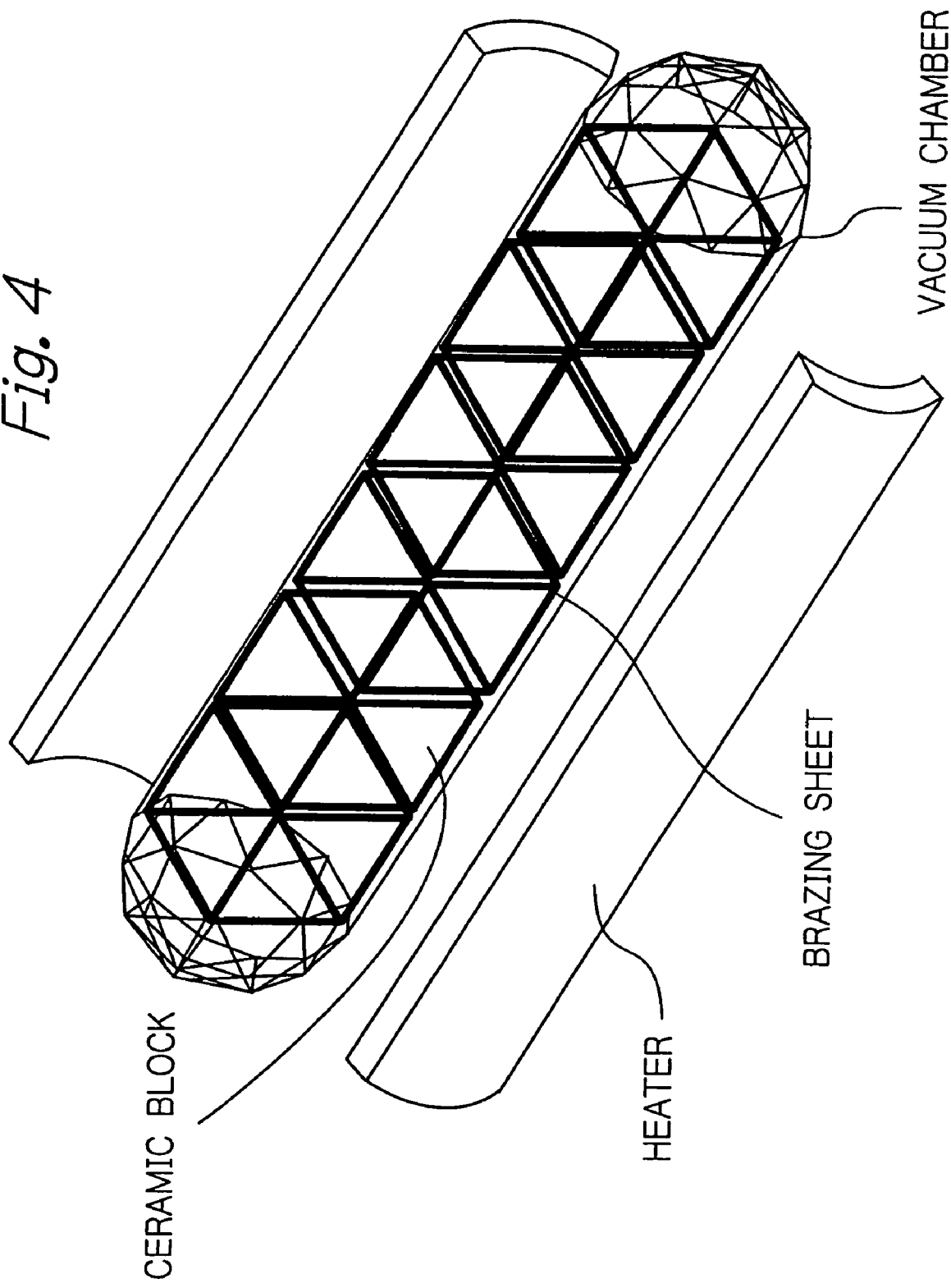
FIG. 4 shows a method of fabricating a ceramic pillar.

FIG. 4 shows a method of fabricating a ceramic pillar by stacking a plurality of ceramic blocks. As shown, a sufficient number of blocks to form a pillar are vacuum sealed into a metal vacuum chamber and heated from the outside, so that the blocks are joined one on top of another by means of brazing sheets to form a single pillar.

Figure 5:
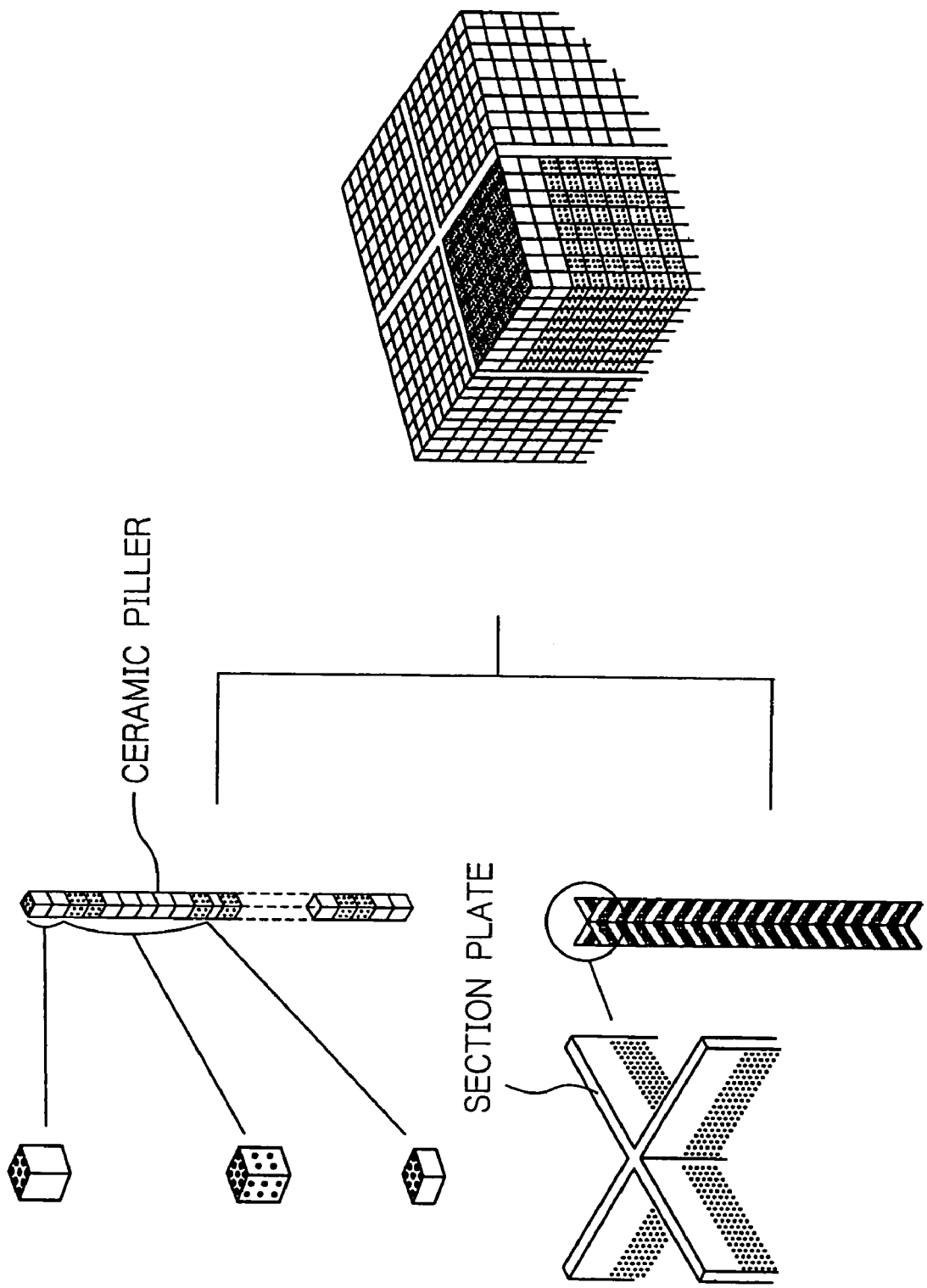
FIG. 5 shows individual ceramic blocks which are joined in a plurality of pillars and then bundled together to form a heat exchanging section.

FIG. 5 shows individual ceramic blocks which are joined in a plurality of pillars and then bundled together to form a heat exchanging section.

Figure 6:
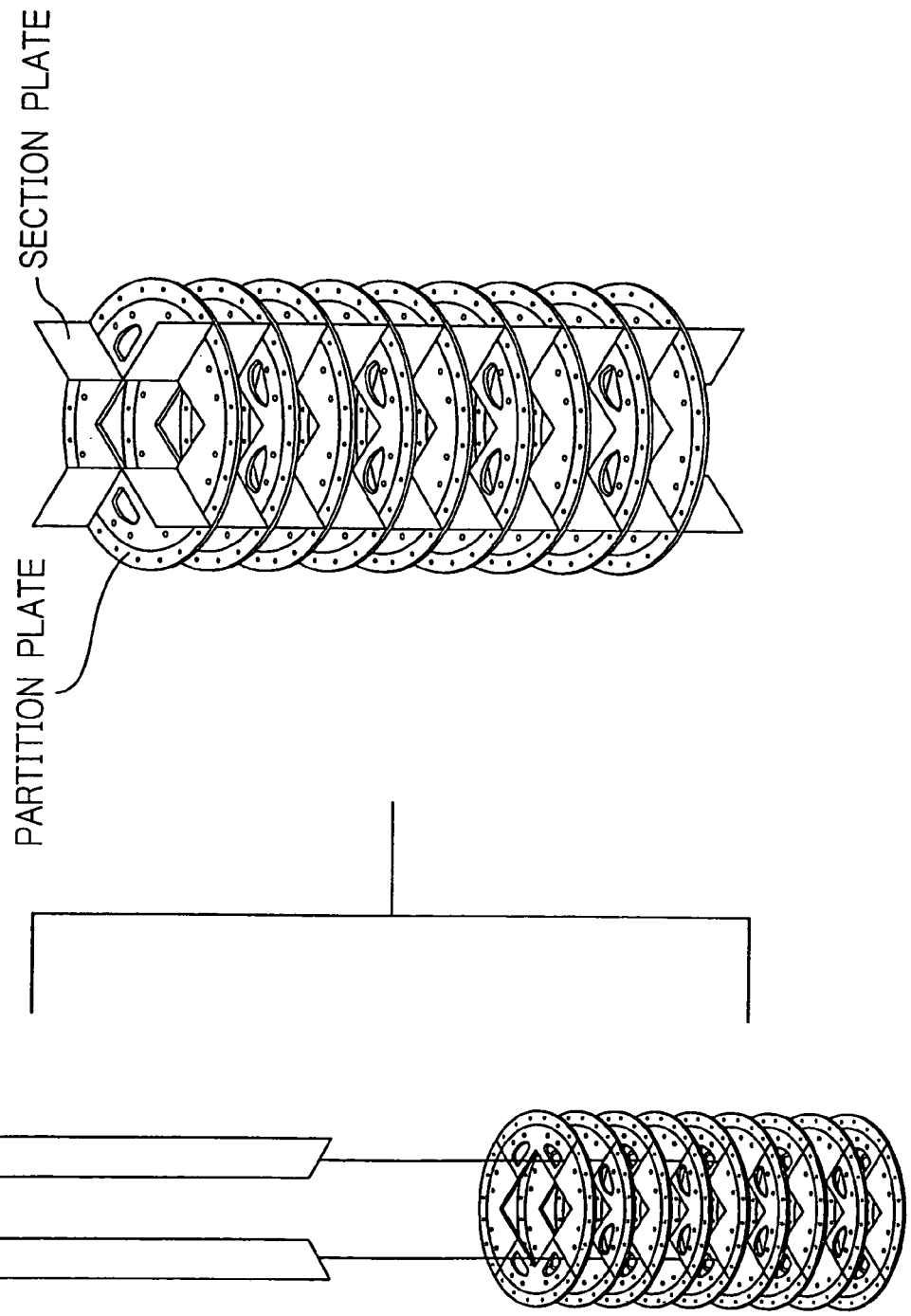
FIG. 6 shows how ceramic pillars are eventually bundled together and how they are combined with section plates and partition plates to establish helium passageways.

FIG. 6 shows how ceramic pillars are eventually bundled together and how they are combined with section plates and partition plates to establish helium passageways.

FIG. 7 shows how section plates and partition plates are assembled, with four ceramic blocks being inserted and fixed in the center between adjacent partition plates.

Figure 9:
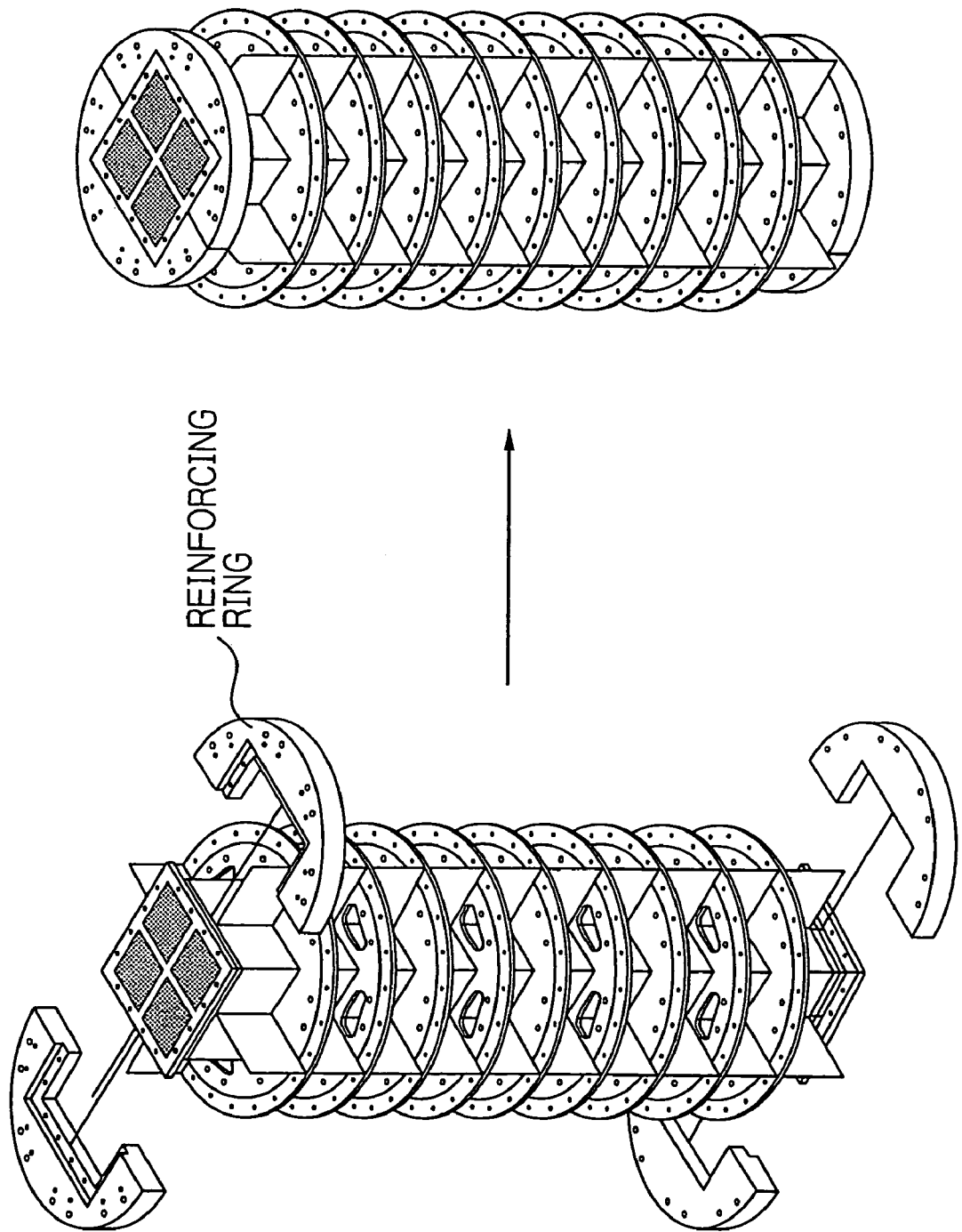
FIG. 9 shows reinforcing rings as subsequently attached to the fabricated heat exchanging section.

FIG. 8 shows ceramic flow rate regulating plates as attached to the top and bottom of the fabricated heat exchanging section and FIG. 9 shows reinforcing rings as subsequently attached to the fabricated heat exchanging section.

Figure 10:
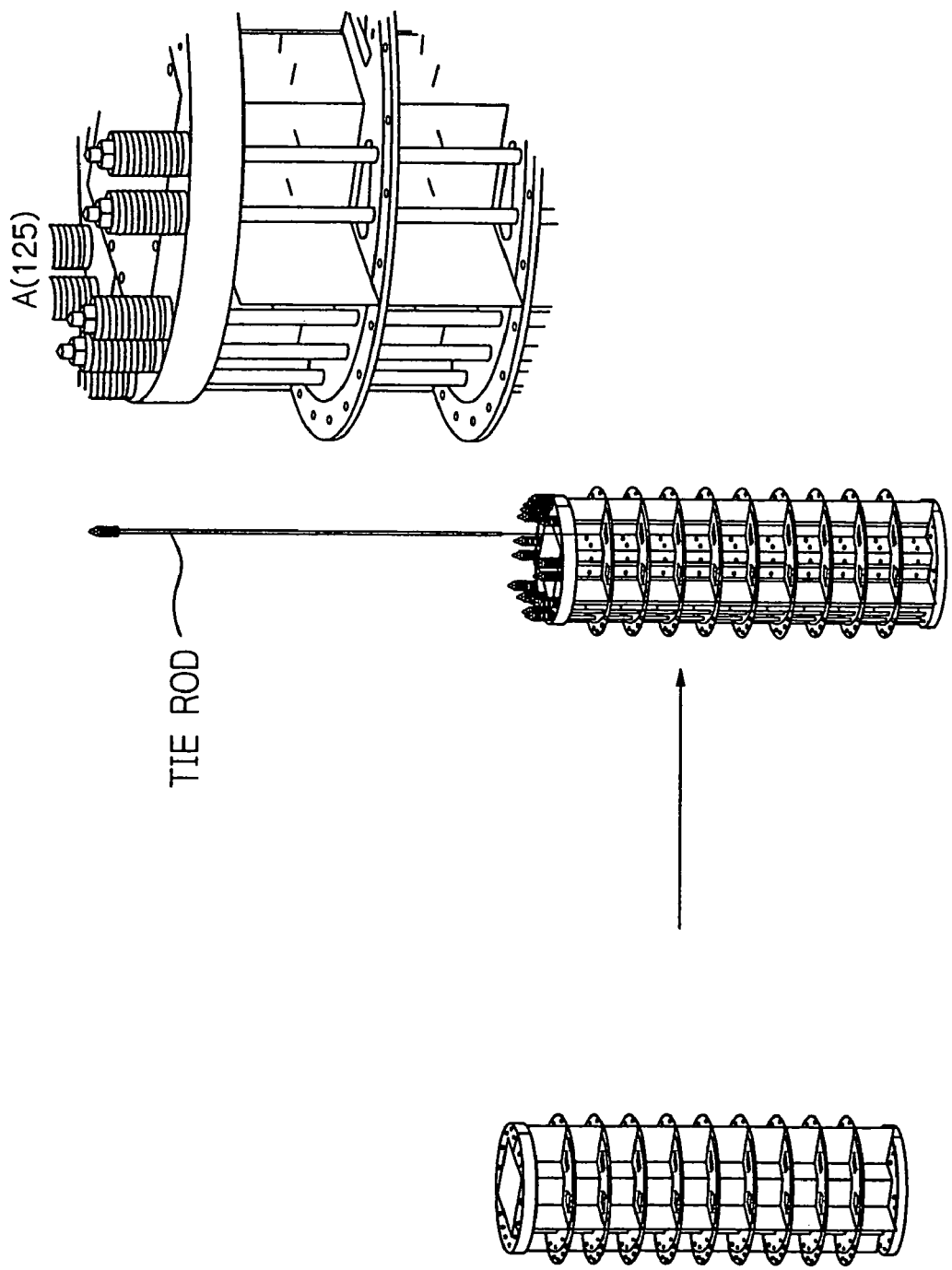
FIG. 10 shows the heat exchanging section as it is tightened by means of tie rods.

FIG. 10 shows the individual constituent elements of the heat exchanging section as they are tightened by means of tie rods.

Figure 11:
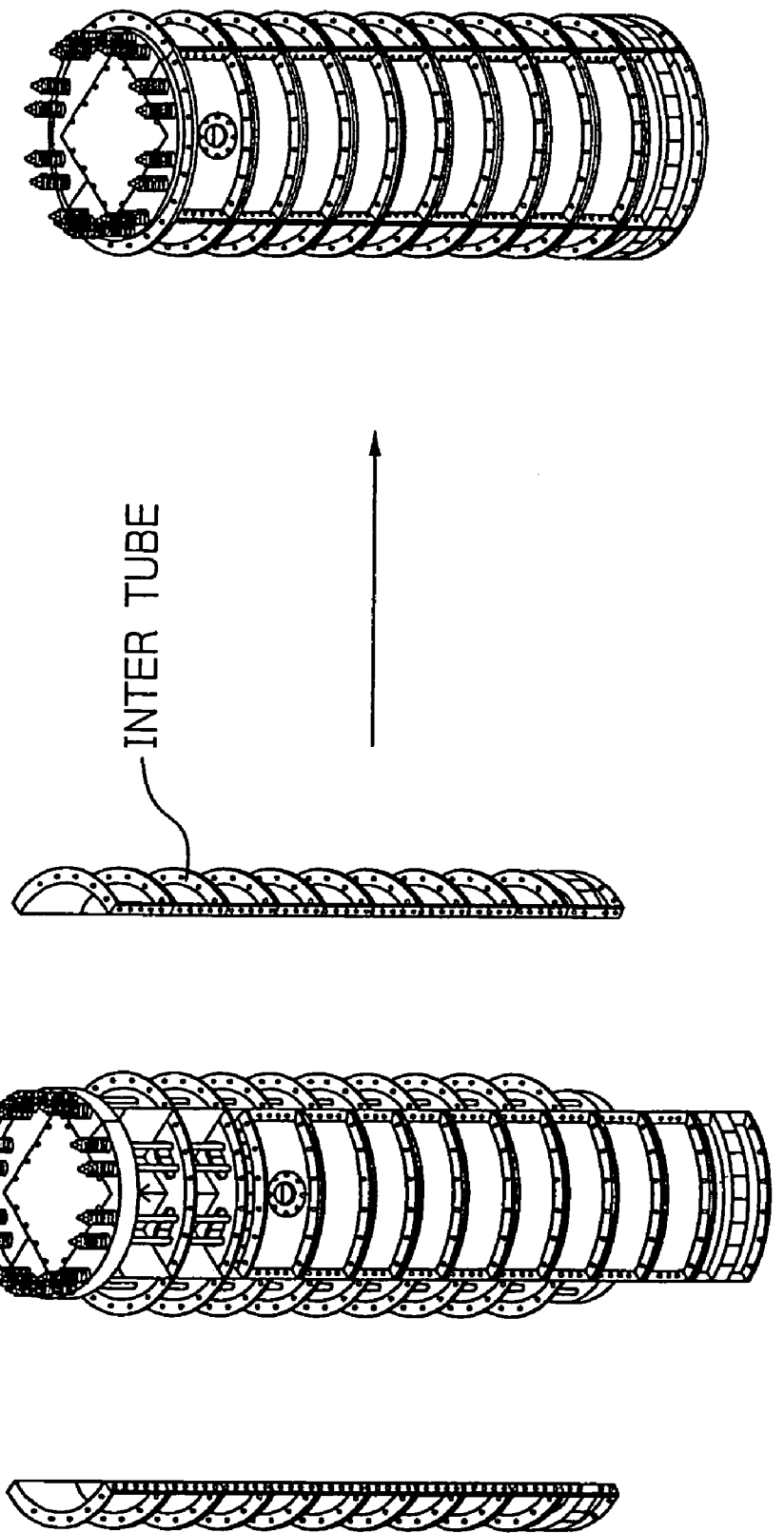
FIG. 11 shows the installation of inner tubes.

FIG. 11 shows the installation of inner tubes on side walls of the heat exchanging section that has been tightened by the tie rods.

Figure 12:
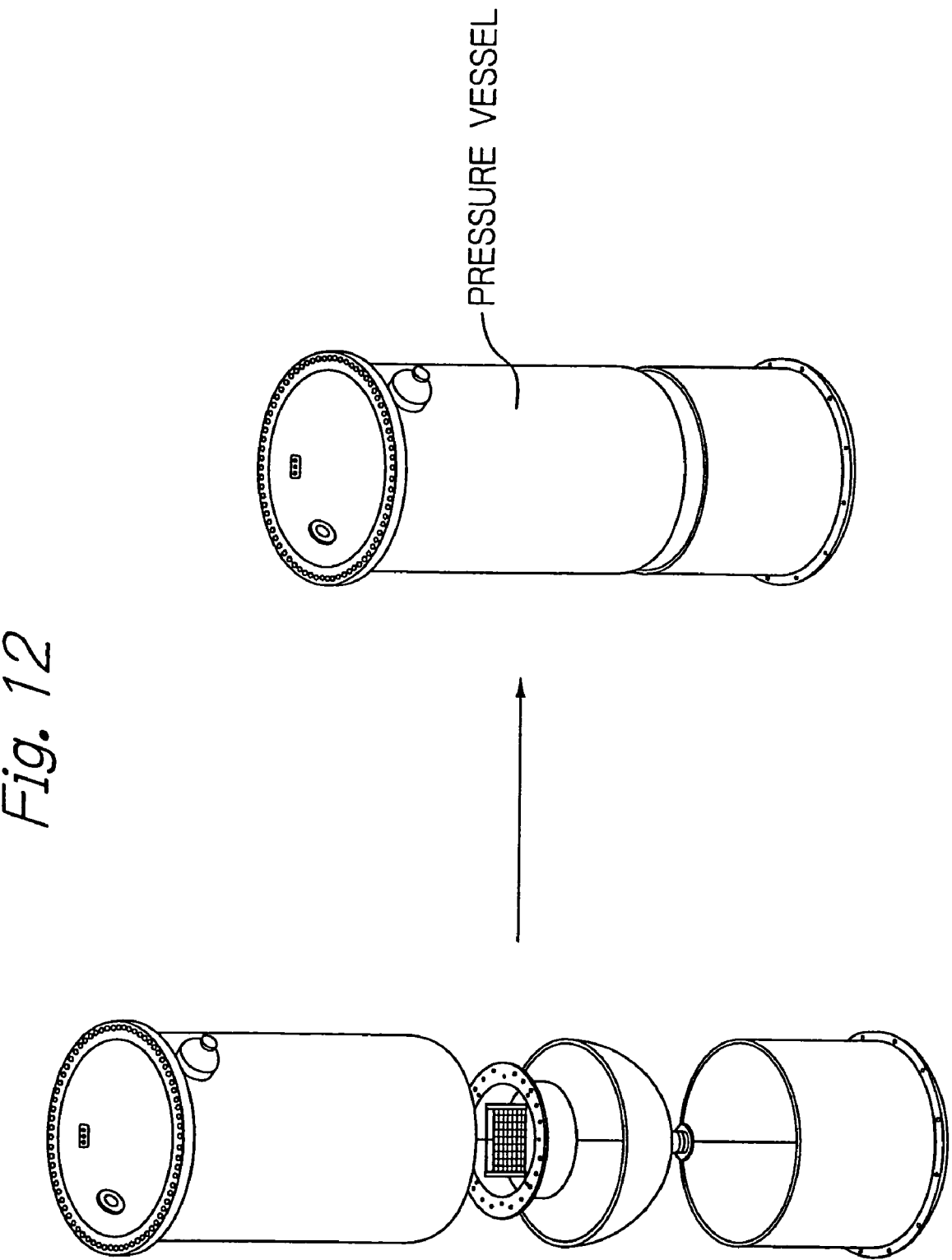
FIG. 12 shows how a pressure vessel for accommodating the heat exchanging section is assembled.

FIG. 12 shows that a pressure vessel for accommodating the heat exchanging section is assembled as shown.

Figure 13:
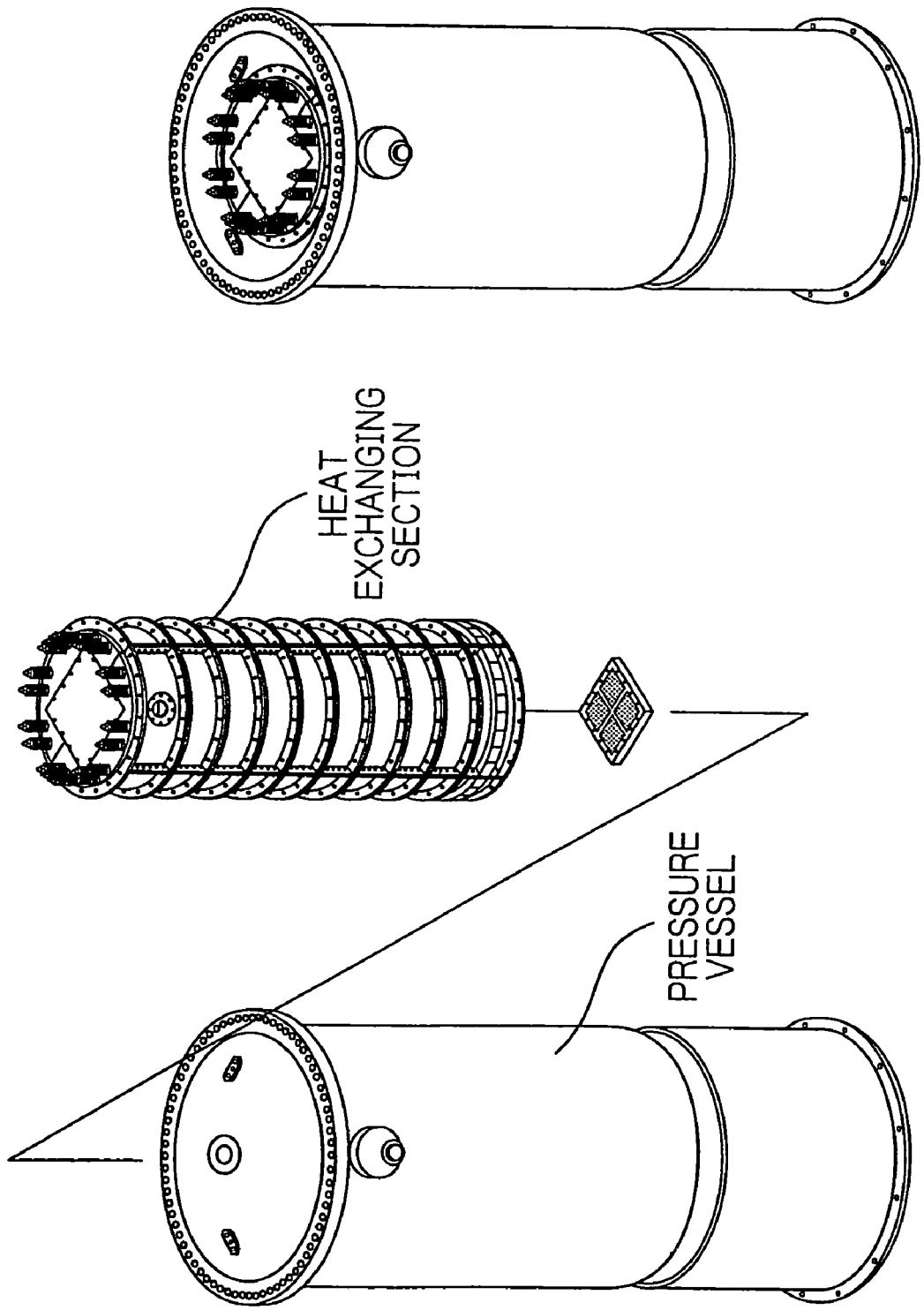
FIG. 13 shows how the heat exchanging section is installed within the pressure vessel.

FIG. 13 shows how the heat exchanging section is installed within the pressure vessel after it has been assembled as shown in FIG. 12.

Figure 14:
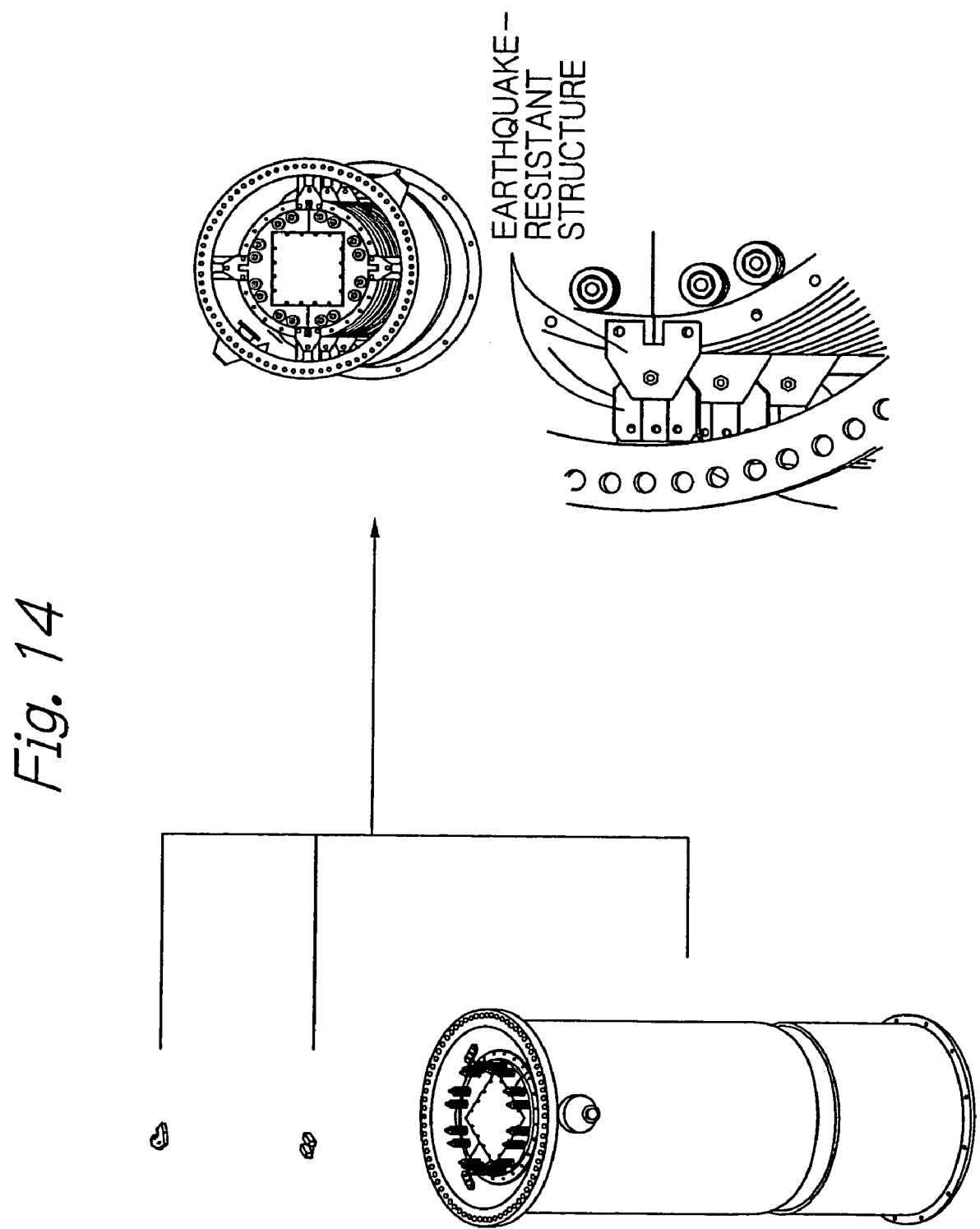
FIG. 14 shows earthquake-resistant structures as they are fitted between the pressure vessel and the heat exchanging section.

FIG. 14 shows earthquake-resistant structures as they are fitted between the pressure vessel and the heat exchanging section.

FIG. 15 shows how a top reflector and helium inlet bellows are attached to the heat exchanging section as it has been mounted in the pressure vessel with the aid of the earthquake-resistant structures.

FIGS. 16 and 17 shows a top cover and a mechanical seal, respectively, as they are fitted on the pressure vessel to complete a heat exchanger for sulfuric acid.

EXAMPLE (A) Design Concept of a Ceramic Compact Concentrated Sulfuric Acid Vaporizer and Experimental Fabrication of Individual Elements Table 1 shows the design specifications of a concentrated sulfuric acid vaporizer for use in a nuclear thermochemical IS plant in actual operation that can be connected to a hot gas furnace of 200 MW. FIG. 2 shows the design concept of the concentrated sulfuric acid vaporizer.

TABLE 1

Specifications of Sulfuric Acid Vaporizer in Actual Operation

| | |
|---|---|
| Hydrogen production rate | 25,514 N$^3$/h |
| Heat load on vaporizer | 63 MV |
| Heating helium gas | In/out temperature 689° C./486° C. |
| | Flow rate 1.2 × 10$^8$ Nm$^3$/h |
| Process | In/out temperature 455° C./486° C. |
| Inlet | H$_2$O/(L/G) 363/816 kmol/h |
| | H$_2$SO$_4$ (L/G) 1552/408 kmol/h |
| | Total 3139 kmol/h |
| Outlet | H$_2$O/(L/G) 0/1178 kmol/h |
| | H$_2$SO$_4$ (L/G) 0/1949 kmol/h |
| | Total 70,045 Nm$^3$/h |
| Heat exchange | Δt1 203° C. Δt2 31° C. LMTD 92° C. |
| | Heat transfer coefficient |
| | 400 kcal/m$^2$ ° C. (as assumed) |
| Pressure | Helium inlet/H$_2$SO$_4$ inlet 3 MPa/2 MPa |

[How to Assemble the Concentrated Sulfuric Vaporizer]

(i) Fabricate a plurality of ceramic blocks (see FIG. 3) in each of which helium channels cross concentrated sulfuric acid solution channels at right angles.

(ii) Fabricate a ceramic block pillar as shown in FIG. 4 by vacuum sealing into a metallic vacuum chamber a sufficient number of ceramic blocks to form a pillar and heating the blocks from the outside.

(iii) Join individual ceramic blocks in a plurality of pillars and bundle them together as shown in FIG. 5 to form a heat exchanging section.

(iv) Eventually bundle ceramic pillars together and combine them with section plates and partition plates to establish helium passageways as shown in FIG. 6.

(v) Attach the ceramic heat exchanging section to the assembled section plates and partition plates as shown in FIG. 7.

(vi) Attach ceramic flow rate regulating plates to the top and bottom of the fabricated heat exchanging section as shown in FIG. 8; subsequently attach reinforcing rings to the fabricated heat exchanging section as shown in FIG. 9.

(vii) Tighten the heat exchanging section by means of tie rods as shown in FIG. 10.

(viii) Install inner tubes as shown in FIG. 11.

(ix) In a separate step, assemble a pressure vessel for accommodating the heat exchanging section as shown in FIG. 12.

(x) Install the heat exchanging section within the pressure vessel as shown in FIG. 13.

(xi) Further, fit earthquake-resistant structures between the pressure vessel and the heat exchanging section as shown in FIG. 14.

(xii) Attach a top reflector and helium inlet bellows as shown in FIG. 15.

(xiii) In the last step, fit a top cover and a mechanical seal on the pressure vessel as shown in FIGS. 16 and 17, respectively.

(B) Concentrated Sulfuric Acid Corrosion Test

Figure 18:
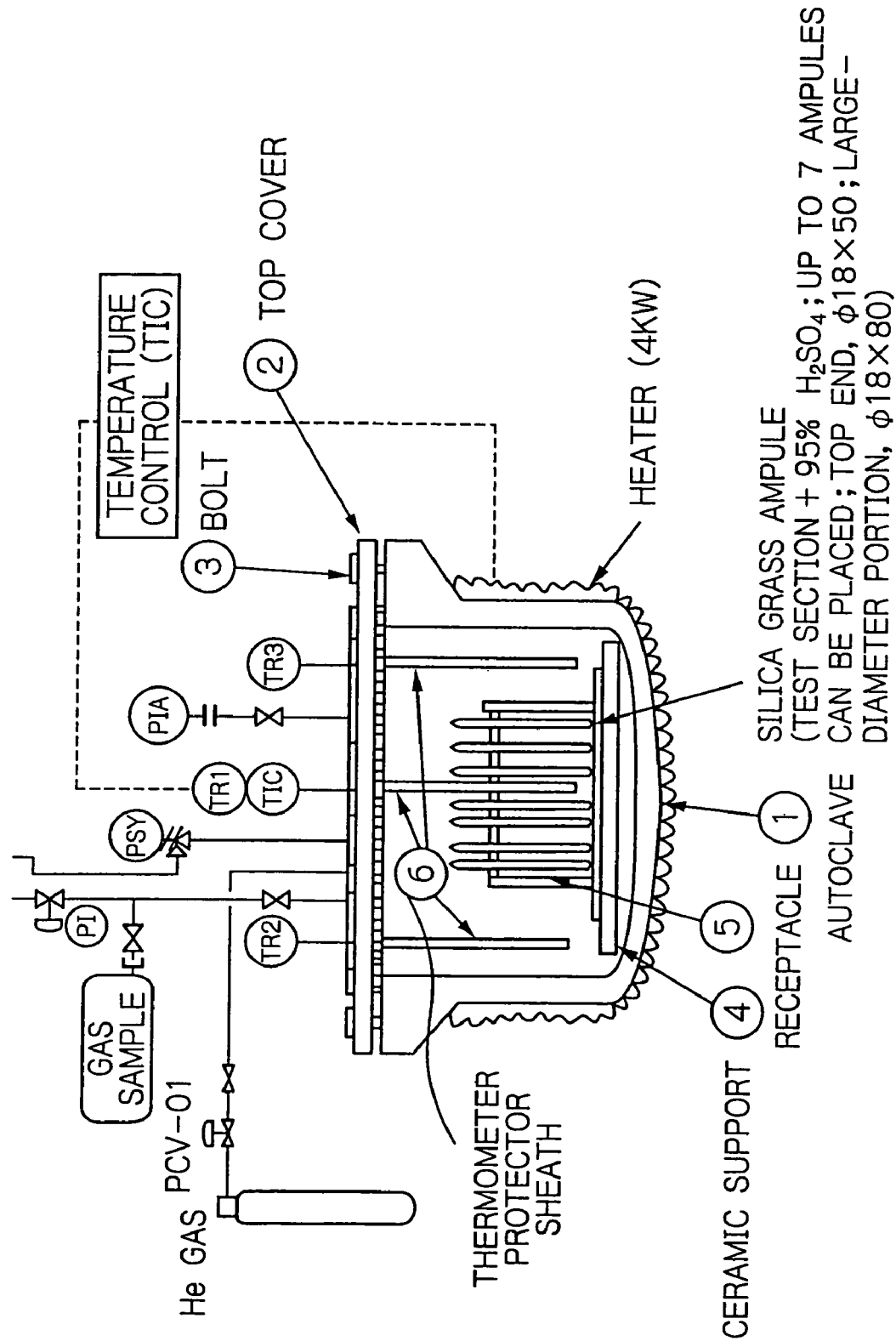
FIG. 18 shows the autoclave employed in a high-temperature, high-pressure corrosion test.

The various ceramics and refractory alloys shown in Table 2 were filled into glass ampules together with concentrated sulfuric acid and subjected to a high-temperature, high-pressure corrosion test in an autoclave (see FIG. 18) under high-temperature (460° C.) high-pressure (2 MPa) conditions for 100 and 1000 hours. Test results are shown in Tables 3 and 4 and in FIG. 19. The results for the 1000-h test are summarized in Table 5. Silicon carbide and silicon nitride were found to have satisfactory corrosion resistance.

TABLE 2

Test Sections for High-Pressure Boiling H₂SO₄ Corrosion Test (×100 h and 1000 h)

| Description | Ampule No. | Designation | Symbol | Classification | Remarks |
|---|---|---|---|---|---|
| 100 h test | 1 | SiC | SiC-1 | ceramic | atmospheric pressure sintering of 97 wt % SiC, 1 wt % B and 2 wt % C |
|  | 2 | Si—SiC | Si—SiC—N-1 |  | atmospheric pressure sintering of 80 wt % SiC and 20 wt % Si (as silicon impregnated) |
|  | 3 | Si₃N₄ | Si₃N₄-1 |  | atmospheric pressure sintering of 1 wt % SrO, 4 wt % MgO and 5 wt % CeO₂ |
|  | 4 | Sx | SX-2 | H₂SO₄ resistant steel | preliminarily oxidized at 800° C. × 90 h |
|  | 5 | FeSi | FS-1 | high-Si ferrous alloy | 14.8 Si—Fe |
|  | 6 |  | FS-2 |  | 19.7 Si—Fe |
| 1000 h test | 1 | SX | SX-2/half | H₂SO₄ resistant steel | oxidized with the atmosphere at 800° C. × 90 h in half size |
|  | 2 |  | SX-2/small |  | oxidized with the atmosphere at 800° C. × 90 h in small size |
|  | 3 | SX | SX-4/RT-1 SX-4/70.1 | H₂SO₄ resistant steel | oxidized with nitric acid in small size oxidized with nitric acid in small size |
|  | 4 | SiC | SiC | ceramic |  |
|  | 5 | Si—SiC | Si—SiC—N-3 | Si-impregnated silicon carbide ceramic |  |
|  | 6 | Si₃N₄ | Si₃N₄ | ceramic |  |
|  | 7 | FeSi | FS-2/untreated FS-2/stress relieved | high-Si ferrous alloy | 19.7 Si—Fe 19.7 Si—Fe, vacuum annealed at 1100° C. × 100 h |

TABLE 3

Results of Size Measurements in High-Pressure Boiling H₂SO₄ Corrosion Test (×100 h)

| Ampule No. | Designation | Symbol | Length (mm) Before test | Length (mm) After test | Length (mm) Change (%) | Width (mm) Before test | Width (mm) After test | Width (mm) Change (%) | Thickness (mm) Before test | Thickness (mm) After test | Thickness (mm) Change (%) |
|---|---|---|---|---|---|---|---|---|---|---|---|
| 1 | SX-2 | SX-2/half | 26.824 | 26.71 | −0.42% | 3.949 | 3.944 | −0.13% | 1.516 | 1.358 | −10.42% |
| 2 |  | SX-2/small | 1.798 | 1.789 | −0.50% | 3.988 | 4.1 | 2.81% | 1.545 | 1.589 | 2.85% |
| 3 | SX-4 | SX-4/RT-1 | 15.493 | 15.453 | −0.26% | 3.943 | 3.878 | −1.65% | 1.635 | 1.624 | −0.67% |
|  |  | SX-4/70.1 | 15.071 | 15.063 | −0.05% | 3.937 | 3.903 | −0.86% | 1.627 | 1.744 | 7.19% |
| 4 | SiC | SiC | 39.727 | 39.71 | −0.04% | 4.035 | 4.034 | −0.02% | 2.993 | 2.991 | −0.07% |
| 5 | Si—SiC | Si—SiC | 40.029 | 40.04 | 0.03% | 4.061 | 4.06 | −0.02% | 3.077 | 3.080 | 0.10% |
| 6 | Si₃N₄ | Si₃N₄ | 39.826 | 39.8 | −0.07% | 4.065 | 4.068 | 0.07% | 3.013 | 3.021 | 0.27% |
| 7 | FeSi | FS-2/untreated | 19.083 | 19.101 | 0.09% | 3.638 | 3.7 | 1.70% | 3.595 | 3.638 | 1.20% |
|  |  | FS-2/stress relieved | 19.585 | 20.055 | 2.40% | 5.700 | 3.705 | −35.00% | 5.557 | 3.578 | −35.61% |

TABLE 4

Results of Weight Measurements and Corrosion Rate in High-Pressure Boiling H₂SO₄ Corrosion Test (×100 h)

| Ampule No. | Designation | Symbol | Weight (g) Before test | Weight (g) After test | Weight change (%) | Weight change (mg) | Area (cm²) | Corrosion rate (g/m² h) | Remarks |
|---|---|---|---|---|---|---|---|---|---|
| 1 | SX-2 | SX-2/half | 1.2162 | 0.9816 | 19.29% | −234.6 | 0.03052 | 0.961 | Ampule broke in 800 h |
| 2 |  | SX-2/small | 0.0772 | 0.0656 | 15.03% | −11.6 | 0.00322 | 0.360 |  |
| 3 | SX-4 | SX-4/RT-1 | 0.7570 | 0.6738 | 10.99% | −83.2 | 0.01857 | 1.244 | Ampule broke in 360 h |
|  |  | SX-4/70.1 | 0.7967 | 0.7198 | 9.65% | −76.9 | 0.01805 | 1.183 | Ampule broke in 360 h |
| 4 | SiC | SiC | 1.4476 | 1.4487 | −0.08% | 1.1 | 0.05826 | −0.002 |  |
| 5 | Si—SiC | Si—SiC | 1.4823 | 1.4856 | −0.22% | 3.3 | 0.05964 | −0.006 |  |
| 6 | Si₃N₄ | Si₃N₄ | 1.5611 | 1.5653 | −0.27% | 4.2 | 0.05883 | −0.007 |  |
| 7 | FeSi | FS-2/untreated | 1.6720 | 1.6330 | 2.33% | −39.0 | 0.03022 | 0.129 |  |
|  |  | FS-2/stress relieved | 1.7425 | 1.7097 | 1.88% | −32.8 | 0.05043 | 0.065 |  |

TABLE 5

Summary of 1000 h Test

| Designation | Symbol | Dimensional change | Corrosion rate | Appearance | Cross section observed at magnification | Others | Overall rating |
|---|---|---|---|---|---|---|---|
| SX-2 | SX-2/half | X | X | ⊚ | ⊚ | — | X |
|  | SX-2/small | ○ | Δ | ⊚ | ⊚ | — | Δ |
| SX-4 | SX-4/RT-1 | Δ | X | ⊚ | ⊚ | — | X |
|  | SX-4/70.1 | Δ | X | ⊚ | ⊚ | — | X |
| SiC | SiC | ⊚ | ⊚ | ⊚ | ⊚ | ○ | ○ |
| Si—SiC | Si—SiC | ⊚ | ⊚ | ⊚ | ⊚ | ○ | ○ |
| $Si_3N_4$ | $Si_3N_4$ | ⊚ | ⊚ | ⊚ | ⊚ | ○ | ○ |
| FeSi | FS-2/untreated | ⊚ | Δ | X | X | — | X |
|  | FS-2/stress relieved | X | Δ | X | X | — | X |

What is claimed is:

1. A method for gasifying a concentrated sulfuric acid solution in concentrated sulfuric acid vaporizer equipped with a compact heat exchanger having corrosion resistance at high temperatures above 1000° C., the method comprising:
    supplying a concentrated sulfuric acid solution from a bottom of a vaporizer via a first feed channel;
    introducing a helium gas from a hot gas furnace laterally through an upper portion of the vaporizer via a second feed channel;
    wherein first and second feed channels are oriented perpendicular to one another in each one of ceramic blocks of the vaporizer;
    wherein the concentrated sulfuric acid solution and the helium gas undergo heat exchange until the concentrated sulfuric acid solution is completely gasified, and
    wherein the concentrated sulfuric acid vaporizer is associated with a Bunsen reaction for decomposing water into hydrogen and oxygen through a combination of a sulfuric acid decomposition and regeneration cycle with a hydrogen iodide decomposition and synthesis cycle, wherein thermal energy for the sulfuric acid cycle and the hydrogen iodide cycle is supplied by the hot gas furnace via the compact heat exchanger, wherein the compact heat exchanger comprises:
    ceramic blocks made from silicon carbide or silicone nitride having first feed channels between two opposing sides of each block, the first feed channels being held open so as to flow the concentrated sulfuric acid solution upward through the first feed channels;
    the ceramic blocks having second feed channels between two other opposing sides of each block, the second feed cannels being held open so as to flow hot helium gas laterally through the second feed channels of each block, so as to transfer heat from the second feed channels to the first feed channels so as to heat the sulfuric acid in each block,
    wherein the first and second feed channels do not communicate with one another;
    wherein ceramic pillars are fabricated by stacking a plurality of the ceramic blocks, the blocks being joined one on top of another with brazing sheets to form each pillar;
    wherein a heat exchanging section is formed by combining four ceramic pillars with section plates and partition plates to establish lateral helium passageways;
    wherein ceramic flow rate regulating plates are attached to a top and to a bottom of the heat exchanging section, respectively;
    wherein a pressure vessel accommodates the heat exchanging section; and
    wherein earthquake-resistant connectors are fitted between the pressure vessel and the heat exchanging section.

* * * * *

UNITED STATES PATENT AND TRADEMARK OFFICE
CERTIFICATE OF CORRECTION

| | |
|---|---|
| PATENT NO. | : 7,981,168 B2 |
| APPLICATION NO. | : 12/232532 |
| DATED | : July 19, 2011 |
| INVENTOR(S) | : Shintaro Ishiyama et al. |

It is certified that error appears in the above-identified patent and that said Letters Patent is hereby corrected as shown below:

Column 7, Line 42, in Claim 1, delete "silicone" and insert --silicon--, therefor.

Signed and Sealed this
Eleventh Day of October, 2011

David J. Kappos
*Director of the United States Patent and Trademark Office*